(12) United States Patent
Gloss et al.

(10) Patent No.: US 7,092,242 B1
(45) Date of Patent: Aug. 15, 2006

(54) POLYMERIC RESTRAINTS FOR CONTAINING AN ANODE IN AN ELECTROLYTIC CAPACITOR FROM HIGH SHOCK AND VIBRATION CONDITIONS

(75) Inventors: Edward Gloss, Clarence, NY (US); Rodney Stringham, Corfu, NY (US); J. Michael Druding, Orchard Park, NY (US); Barry Muffoletto, Alden, NY (US)

(73) Assignee: Greatbatch, Inc., Clarence, NY (US)

( * ) Notice: Subject to any disclaimer, the term of this patent is extended or adjusted under 35 U.S.C. 154(b) by 0 days.

(21) Appl. No.: 11/222,259

(22) Filed: Sep. 8, 2005

(51) Int. Cl.
*H01G 9/00* (2006.01)

(52) U.S. Cl. .................. 361/523; 361/301.3; 361/508; 361/525; 361/528; 361/529; 29/25.03

(58) Field of Classification Search ........ 361/523–534, 361/517–520, 508–512, 312.1, 321.2, 301.3; 29/25.03
See application file for complete search history.

(56) References Cited

U.S. PATENT DOCUMENTS

| | | | |
|---|---|---|---|
| 3,697,823 A | 10/1972 | Correll | |
| 4,208,699 A * | 6/1980 | Philpott et al. | 361/519 |
| 5,867,361 A | 2/1999 | Wolf et al. | |
| 5,894,403 A | 4/1999 | Shah et al. | |
| 5,920,455 A | 7/1999 | Shah et al. | |
| 5,959,831 A * | 9/1999 | Maeda et al. | 361/523 |
| 6,031,710 A | 2/2000 | Wolf et al. | |
| 6,219,222 B1 | 4/2001 | Shah et al. | |
| 6,224,985 B1 | 5/2001 | Shah et al. | |
| 6,297,943 B1 | 10/2001 | Carson | |
| 6,334,879 B1 | 1/2002 | Muffoletto et al. | |
| 6,468,605 B1 | 10/2002 | Shah et al. | |
| 6,699,767 B1 | 3/2004 | Huntington | |
| 6,850,405 B1 | 2/2005 | Mileham et al. | |
| 6,859,353 B1 | 2/2005 | Elliott et al. | |
| 6,919,240 B1 * | 7/2005 | Uzawa et al. | 438/171 |
| 2003/0007311 A1 | 1/2003 | Kojima et al. | |
| 2003/0081374 A1 | 5/2003 | Takada | |
| 2003/0090857 A1 | 5/2003 | Liu et al. | |
| 2003/0142464 A1 | 7/2003 | Liu et al. | |
| 2003/0169559 A1 | 9/2003 | Honda et al. | |
| 2003/0179536 A1 | 9/2003 | Stevenson et al. | |
| 2005/0190530 A1 * | 9/2005 | Muffoletto et al. | 361/517 |

FOREIGN PATENT DOCUMENTS

JP     2003-249422 A     9/2003

* cited by examiner

*Primary Examiner*—Nguyen T. Ha
(74) *Attorney, Agent, or Firm*—Michael F. Scalise (57) ABSTRACT

An electrolytic capacitor comprising a plurality of polymeric structures molded about the periphery of the anode pellet is described. The polymeric structures contact between a weld strap surrounding the butt seam between mating "clamshell" casing portions and the anode pellet sidewall. That way, the anode pellet is restrained from moving along both an x- and y-axes inside the casing. Having the cathode active material contacting the opposed major casing sidewalls being in a closely spaced relationship with the anode pellet through an intermediate separator prevents movement along the z-axis. The resulting capacitor is particularly well suited for use in high shock and vibration conditions.

19 Claims, 13 Drawing Sheets

POLYMERIC RESTRAINTS FOR CONTAINING AN ANODE IN AN ELECTROLYTIC CAPACITOR FROM HIGH SHOCK AND VIBRATION CONDITIONS

BACKGROUND OF THE INVENTION

The present invention generally relates to a capacitor and, more particularly, to a capacitor capable of being subjected to high shock and vibration forces without failing.

SUMMARY OF THE INVENTION

Capacitors are used frequently in applications where high shock and vibration levels are experienced. A notable example is in the oil and gas industry where "measurement while drilling" applications can cause severe stress forces to a capacitor. Under high shock and vibration conditions, capacitors without adequate stabilization are capable of failing due to movement of the electrodes within the case, for example the anode pellet in an electrolytic capacitor. This movement can result in mechanical failure of the anode pellet lead rendering the capacitor inoperative. In that respect, mechanical stabilization of the anode pellet inside the casing is important for improving the reliability and safety of capacitors subjected to high shock and vibration conditions.

The capacitor of the present invention provides such mechanical stabilization through a plurality of polymeric point restraints that contact between the casing sidewall and the anode pellet sidewall to lock the anode in place. Alternatively, the polymeric point restraints contact between a weld strap surrounding the butt seam between mating "clam shell" casing portions and the anode pellet sidewall. This structure prevents the anode pellet from moving along both an x- and y-axes. Having the cathode active material coating the opposed major casing sidewalls being in a closely spaced relationship with the anode pellet through an intermediate separator prevents movement along the z-axis.

These and other aspects of the present invention will become more apparent to those skilled in the art by reference to the following description and to the appended drawings.

DETAILED DESCRIPTION OF THE PREFERRED EMBODIMENTS

Figure 1:
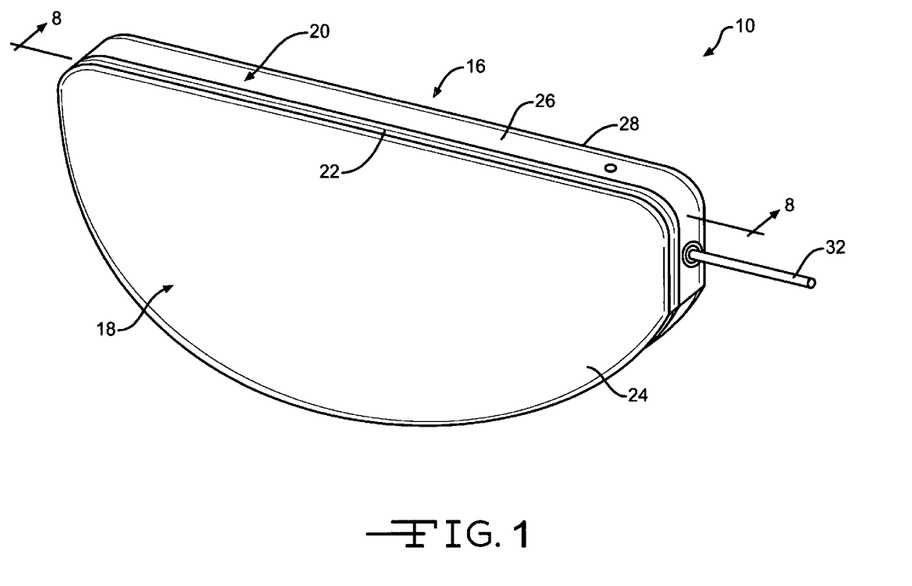
FIG. 1 is a perspective view of a capacitor 10 according to the present invention.
Figure 2:
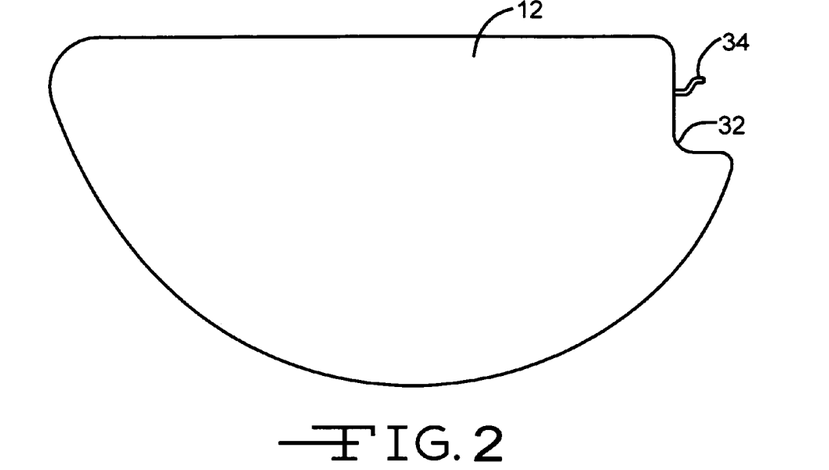
FIG. 2 is a side elevational view of an anode 12 having an embedded anode wire 34 extending from a notch 32 thereof.

Referring now to the drawings, FIG. 1 is a perspective view showing a capacitor 10 according to the present invention. The capacitor 10 comprises an anode 12 (FIG. 2) of an anode active material and a cathode of a cathode active material 14 (FIG. 7) housed inside a hermetically sealed casing 16. The capacitor electrodes are operatively associated with each other by a working electrolyte (not shown) contained inside the casing, as will be described in detail hereinafter. The capacitor 10 is of an electrolytic type with the cathode comprising a conductive substrate having capacitive properties.

As particularly shown in FIGS. 1, 7 to 9 and 13, the casing 16 is of a metal material comprising first and second casing portions 18 and 20. Casing portion 18 comprises a surrounding sidewall 22 extending to a face wall 24. Similarly, casing portion 20 comprises a surrounding sidewall 26 extending to a face wall 28. Sidewall 26 is sized so that sidewall 22 is in an overlapping relationship therewith. Then, the casing portions 18, 20 are hermetically sealed together by welding the overlapping sidewalls 22, 26 where they contact. The weld 30 is provided by any conventional means; however, a preferred method is by laser welding.

The mating casing portions 18, 20 are preferably selected from the group consisting of tantalum, titanium, nickel, molybdenum, niobium, cobalt, stainless steel, tungsten, platinum, palladium, gold, silver, copper, chromium, vanadium, aluminum, zirconium, hafnium, zinc, iron, and mixtures and alloys thereof. Preferably, the face and sidewalls of the casing portions have a thickness of about 0.005 to about 0.015 inches.

The active material of the anode 12 is typically of a metal selected from the group consisting of tantalum, aluminum, titanium, niobium, zirconium, hafnium, tungsten, molybdenum, vanadium, silicon, germanium, and mixtures thereof in the form of a pellet. As is well known by those skilled in the art, the anode metal in powdered form, for example tantalum powder, is compressed into a pellet having a notch 32 from which an embedded anode wire 34 (FIGS. 2, 4 to 6, 8, 10, 11 and 13) extends. The anode wire 34 preferably comprises the same material as the anode active material. The anode pellet is sintered under a vacuum at high temperatures and then anodized in a suitable electrolyte. The anodizing electrolyte fills the pores of the pressed powder body and a continuous dielectric oxide is formed thereon. In that manner, the anode 12 and extending wire 34 are provided with a dielectric oxide layer formed to a desired working voltage. The anode can also be of an etched aluminum, niobium, or titanium foil.

Figure 8:
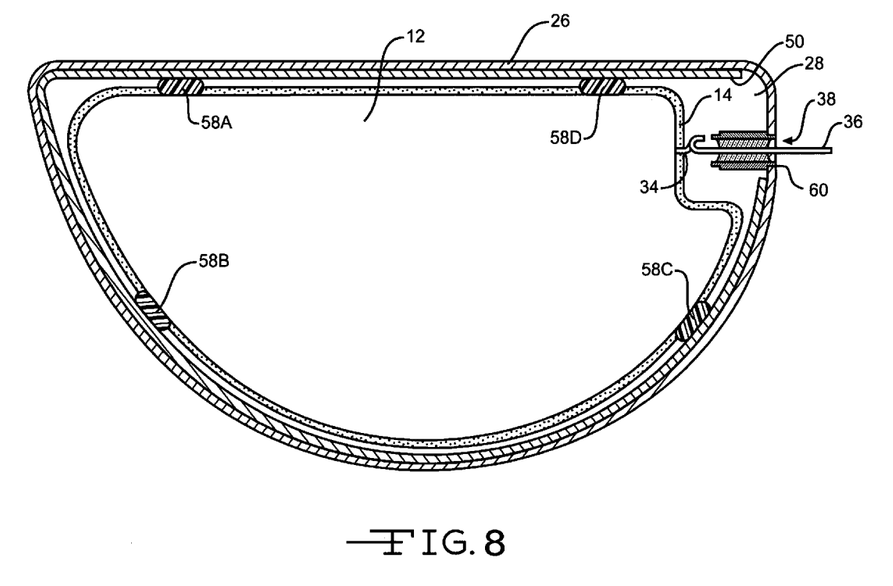
FIG. 8 is a side elevational view showing the assembly of FIG. 6 comprising the anode 12, polymeric point restraints 58A to 58D and weld strap 50 after having being nested in the casing portion 20 of FIG. 7.

After the anode 12 and extending wire 34 are anodized to the desired formation voltage, the dielectric oxide is removed from the wire and there connected to an anode lead 36 supported in an insulative glass-to-metal seal 38 (GTMS). The weld and lead are then re-anodized. The glass-to-metal seal 38 comprises a ferrule 40 defining an internal cylindrical through bore or passage 42 of constant inside diameter. An insulative glass 44 provides a hermetic seal between the bore 42 and the anode lead 36 passing there through. The anode lead 36 has a J-shaped proximal portion 36A that is subsequently connected to a crook in the anode wire 34 such as by laser welding to secure them together. The glass 44 is, for example, ELAN® type 88 or MANSOL™ type 88. As shown in FIGS. 1 and 8, in the final capacitor assembly the GTMS 38 electrically insulates the anode lead 36 connected to the anode wire 34 from the metal casing 18.

A separator 46 (FIG. 4) of electrically insulative material in the shape of a bag completely surrounds and envelops the anode 12 except the extending wire 34. The separator 46 prevents an internal electrical short circuit between the anode 12 and cathode active materials 14 in the assembled capacitor and has a degree of porosity sufficient to allow flow there through of the working electrolyte during the electrochemical reaction of the capacitor 10. Illustrative separator materials include woven and non-woven fabrics of polyolefinic fibers including polypropylene and polyethylene or fluoropolymeric fibers including polyvinylidene fluoride, polyethylenetetrafluoroethylene, and polyethylenechlorotrifluoroethylene laminated or superposed with a polyolefinic or fluoropolymeric microporous film, non-woven glass, glass fiber materials and ceramic materials. Suitable microporous films include a polyethylene membrane commercially available under the designation SOLUPOR® (DMS Solutech), a polytetrafluoroethylene membrane commercially available under the designation ZITEX® (Chemplast Inc.), a polypropylene membrane commercially available under the designation CELGARD® (Celanese Plastic Company, Inc.), and a membrane commercially available under the designation DEXIGLAS® (C. H. Dexter, Div., Dexter Corp.). Cellulose based separators also typically used in capacitors are contemplated by the scope of the present invention. Depending on the electrolyte used, the separator can be treated to improve its wettability, as is well known by those skilled in the art.

Figure 5:
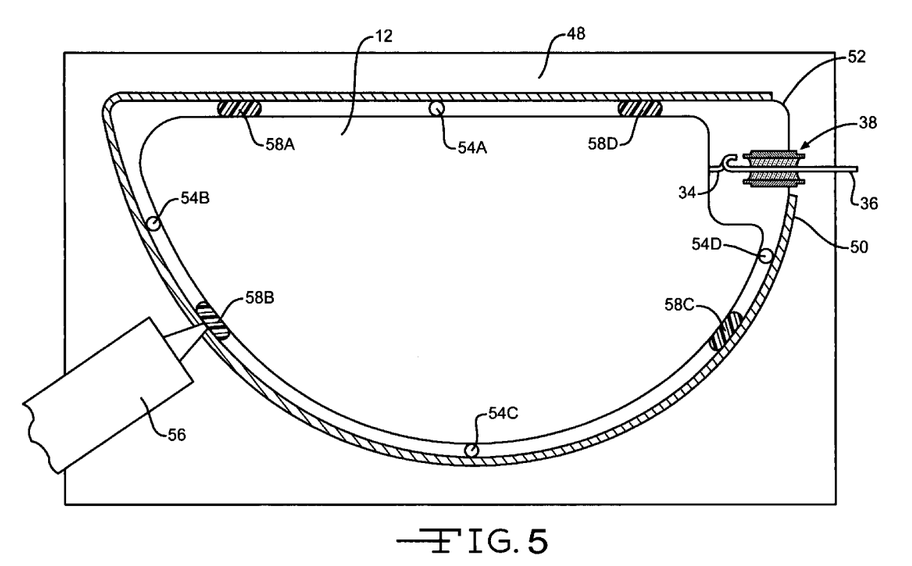
FIG. 5 is a plan view of the anode 12 including the glass-to-metal seal 38 received in a fixture 48 surrounded by a weld strap 50 and with polymeric material being injected at selected locations between the anode and weld strap to form point restraints 58A to 58C.
Figure 6:
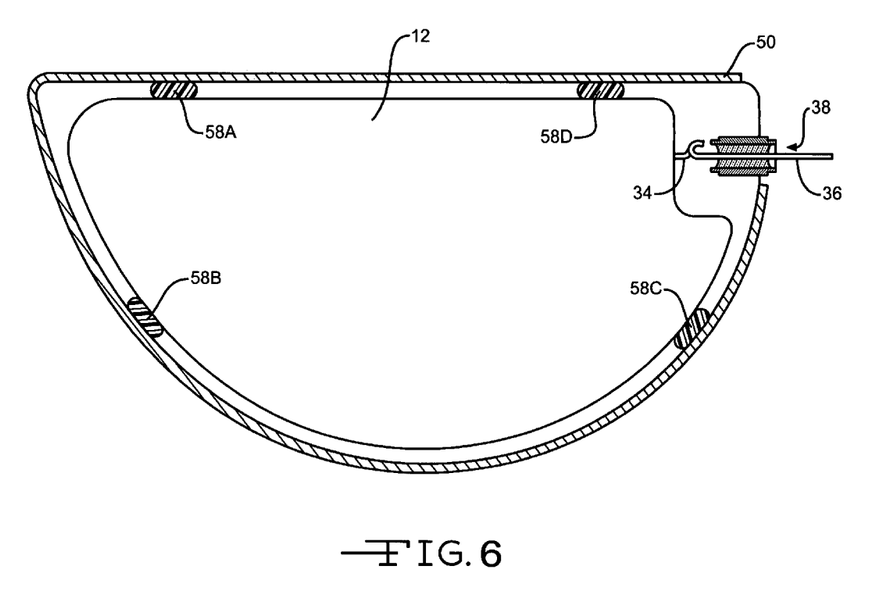
FIG. 6 is a side elevational view showing the anode 12 held in position inside the weld strap 50 by the polymeric point restraints 58A to 58D.

As shown in FIG. 5, the anode 12 connected to the anode lead 36 supported in the GTMS 38 is then positioned inside a fixture 48. A metal weld strap 50 is also positioned in the fixture 48 in a generally enclosing, but spaced relationship with the anode 12. The weld strap 50 is discontinuous at 52 to provide a space for the GTMS 38. As will be described in detail hereinafter, the metal strap 50 serves as a backing to protect the anode 12 and separator 46 from laser welding light when the casing portions 18 and 20 are welded to each other during final capacitor assembly.

Once the anode 12 and GTMS 38 surrounded by the weld strap 50 are properly positioned in the fixture 48, a plurality of spacer pegs 54A to 54D are located about the periphery of the anode. The spacer pegs contact both the weld strap and the anode to maintain uniform spacing between them.

A nozzle 56 is then used to inject a polymeric material at spaced locations between the weld strap 50 and the periphery of the anode sidewall. The thusly-formed polymeric restraints 58 are oval-shaped "point contact" structures that each extends a relatively short distance about the periphery of the anode. While oval-shaped structures are shown, that should not be construed as limiting. They can be of many different shapes in plan view as long as the polymeric structures are of a thickness that substantially matches that of the anode between its major face walls. The polymeric material of the point restraints is of a fast curing type including a polyolefin, a fluoropolymer, a hot melt adhesive, or a UV curable adhesive. A relatively slow curing silastic material is also useful. The anode 12 held in position inside the weld strap 50 by the polymeric point restraints 58A to 58D is then removed from the fixture 48 as an assembly (FIG. 7).

The cathode active material 14 preferably coats the face walls 24, 28, spaced from the respective sidewalls 22, 26. The pad printing process described in U.S. patent application Ser. No. 10/920,942, filed Aug. 18, 2004, is preferred for making such a coating. Ultrasonically generated aerosol as described in U.S. Pat. Nos. 5,894,403; 5,920,455; 6,224,985; and 6,468,605, all to Shah et al., are also suitable deposition methods. These patents and patent application are assigned to the assignee of the present invention and incorporated herein by reference.

Figure 7:
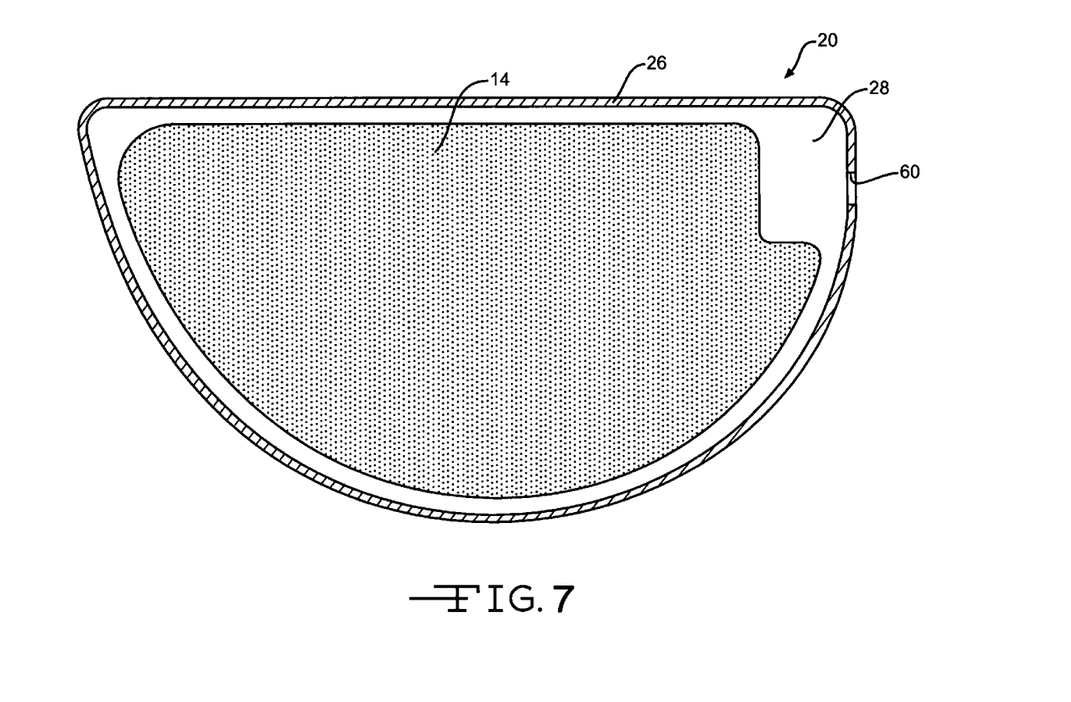
FIG. 7 is a side elevational view of a casing portion 20 supporting a cathode active material 14 on a face wall 28 thereof.

As shown in FIG. 7, casing portion 20 is provided with the cathode active material 14 coated on its face wall 28 in a pattern that generally mirrors the shape of the anode 12. The cathode active material 14 has a thickness of about a few hundred Angstroms to about 0.1 millimeters and is either directly coated on the inner surface of the face wall 28 or it is coated on a conductive substrate (not shown) in electrical contact with the inner surface of the face wall. The other casing portion 18 has the cathode active material 14 similarly coated on its face wall 24 or on a conductive substrate secured to the inner surface of the face wall in electrical contact therewith. In that respect, the face walls 24, 28 may be of an anodized-etched conductive material, have a sintered active material with or without oxide contacted thereto, be contacted with a double layer capacitive material, for example a finely divided carbonaceous material such as graphite or carbon or platinum black, a redox, pseudocapacitive or an under potential material, or be an electroactive conducting polymer such as polyaniline, polypyrole, polythiophene, polyacetylene, and mixtures thereof.

According to one preferred aspect of the present invention, the redox or cathode active material 14 includes an oxide of a first metal, the nitride of the first metal, the carbon nitride of the first metal, and/or the carbide of the first metal, the oxide, nitride, carbon nitride and carbide having pseudocapacitive properties. The first metal is preferably selected from the group consisting of ruthenium, cobalt, manganese, molybdenum, tungsten, tantalum, iron, niobium, iridium, titanium, zirconium, hafnium, rhodium, vanadium, osmium, palladium, platinum, nickel, and lead.

The cathode active material 14 may also include a second or more metals. The second metal is in the form of an oxide, a nitride, a carbon nitride or carbide, and is not essential to the intended use of the conductive face walls 24, 28 as a capacitor electrode. The second metal is different than the first metal and is selected from one or more of the group consisting of tantalum, titanium, nickel, iridium, platinum, palladium, gold, silver, cobalt, molybdenum, ruthenium, manganese, tungsten, iron, zirconium, hafnium, rhodium, vanadium, osmium, and niobium. In a preferred embodiment of the invention, the cathode active material 14 includes an oxide of ruthenium or oxides of ruthenium and tantalum.

Figure 3:
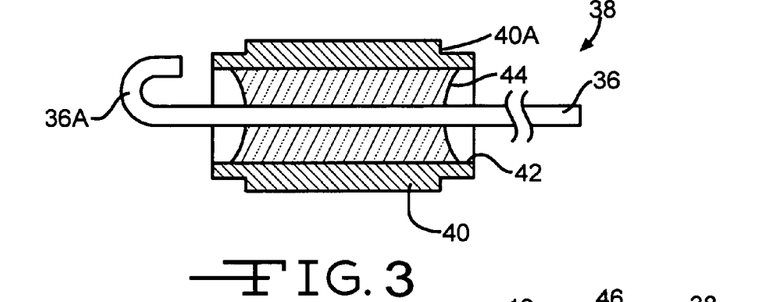
FIG. 3 is a cross-sectional view of a glass-to-metal seal 38 for an anode lead 36.
Figure 4:
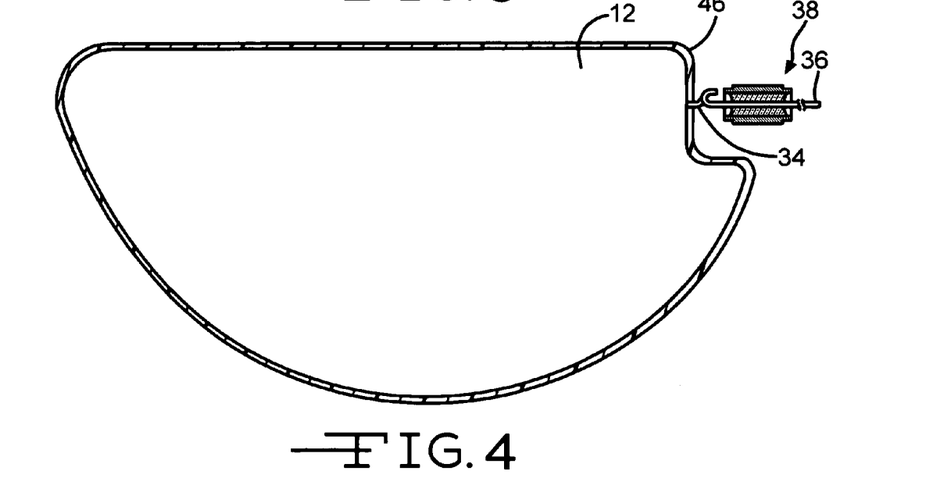
FIG. 4 is a side elevational view of the anode lead 36 including the glass-to-metal seal 38 connected to the embedded wire 34 of anode 12.

As shown in FIG. 8, the anode 12 held in position by the polymeric point restraints 58A to 58D and the weld strap 50 as an assembly is then nested in the casing portion 20 with the GTMS 38 received in an opening 60 (FIG. 8) in the casing sidewall 26. The ferrule 40 of the GTMS has a distal step 40A (FIG. 3) that fits into the casing opening 60 in a tight fitting relationship. The weld strap 50 is likewise sized to fit inside the perimeter of the casing sidewall 26 in a closely spaced relationship. The ferrule 40 is then secured to the casing sidewall 26 such as by laser welding. This provides the anode 12 secured inside the casing portion 20 by the polymeric point restraints 58A to 58D and the weld strap 50. In this position, the anode major face wall 12 (FIG. 9) is resting on the casing sidewall 26. However, the intermediate separator 46 prevents direct contact between the anode 12 and the cathode active material 14.

The other casing portion 18 is then mated to the casing portion 20 with their respective sidewalls 22 and 26 overlapping each other. The continuous weldment 30 provided about the perimeter of the casing sidewalls 22 and 26, such as by laser welding, secures the casing portions 18 and 20 to each other. The weld strap 50, however, prevents laser light from penetrating into the interior of the capacitor to damage the anode 12 and separator 46 among other heat sensitive components.

A working electrolyte (not shown) is then provided in the capacitor through an opening in one of the casing portions 18, 20. A suitable working electrolyte for the capacitor 10 is described in U.S. Pat. No. 6,219,222 to Shah et al., which includes a mixed solvent of water and ethylene glycol having an ammonium salt dissolved therein. U.S. Pub. Nos. 2003/0090857 and 2003/0142464 describe other working electrolytes for the present capacitors. The working electrolyte of the former publication comprises water, a water-soluble inorganic and/or organic acid and/or salt, and a water-soluble nitro-aromatic compound while the latter relates to an electrolyte having de-ionized water, an organic solvent, isobutyric acid and a concentrated ammonium salt. These publications and patent are assigned to the assignee of the present invention and incorporated herein by reference. The electrolyte fill opening is then closed by a hermetic closure (not shown), as is well known by those skilled in the art.

The spaces formed between the polymeric point restraints 58A to 58D provide for the electrolyte to thoroughly wet the anode 12 including the enveloping separator 46 as well as the cathode active materials 14 to provide the capacitor 10 in a functional state. The weld strap 50 encloses and contacts the polymeric point restraints 58A to 58D that, in turn, contact the separator 46 at the anode sidewall. This prevents any movement of these components should the capacitor be subject to high shock and vibration conditions.

The casing 16, including the portions 18, 20, being of a conductive metal serves as the negative terminal for making electrical connection between the capacitor 10 and its load. A pin (not shown) is welded to one of the casing portions 18, 20 to provide this. The anode lead 36 extending outside the capacitor 10 is hermetically sealed from the interior of the capacitor and insulated from the mating casing portions 20, 22 by the GTMS 38 to serve as the positive terminal for the capacitor 10.

Figure 9:
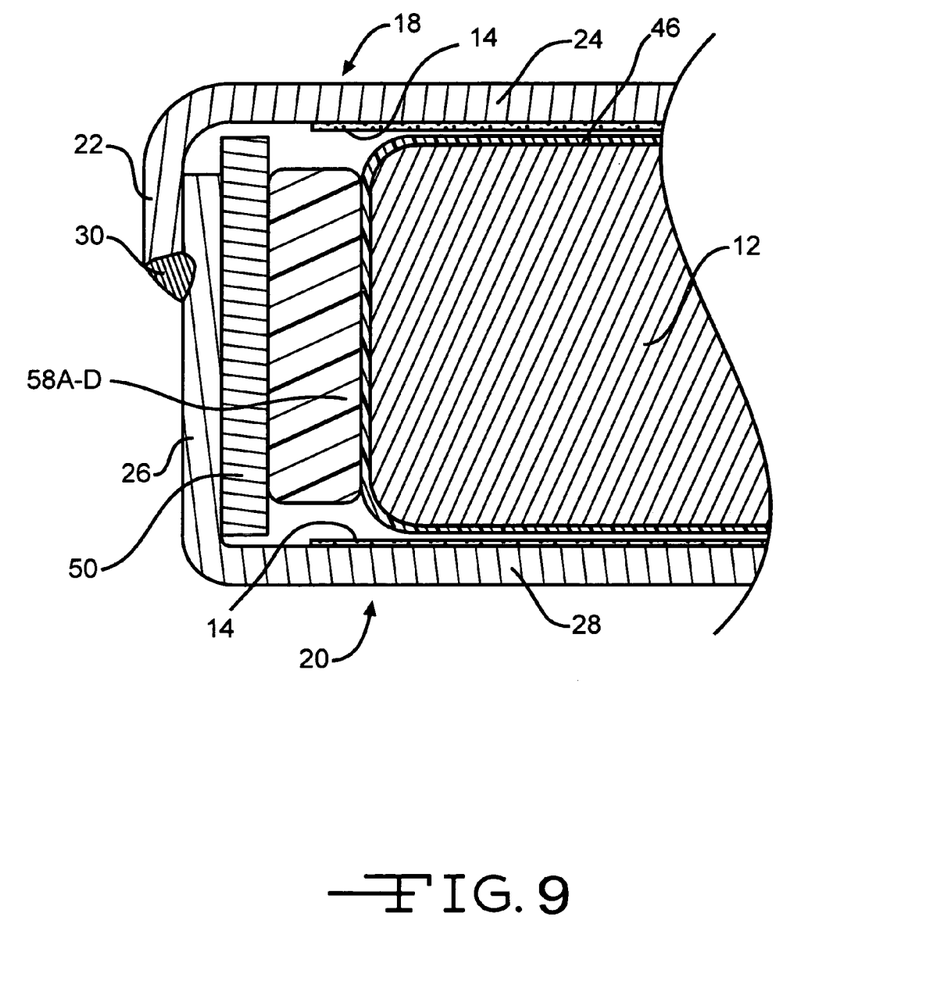
FIG. 9 is a cross-sectional view of the fully assembled capacitor 10.
Figure 9A:
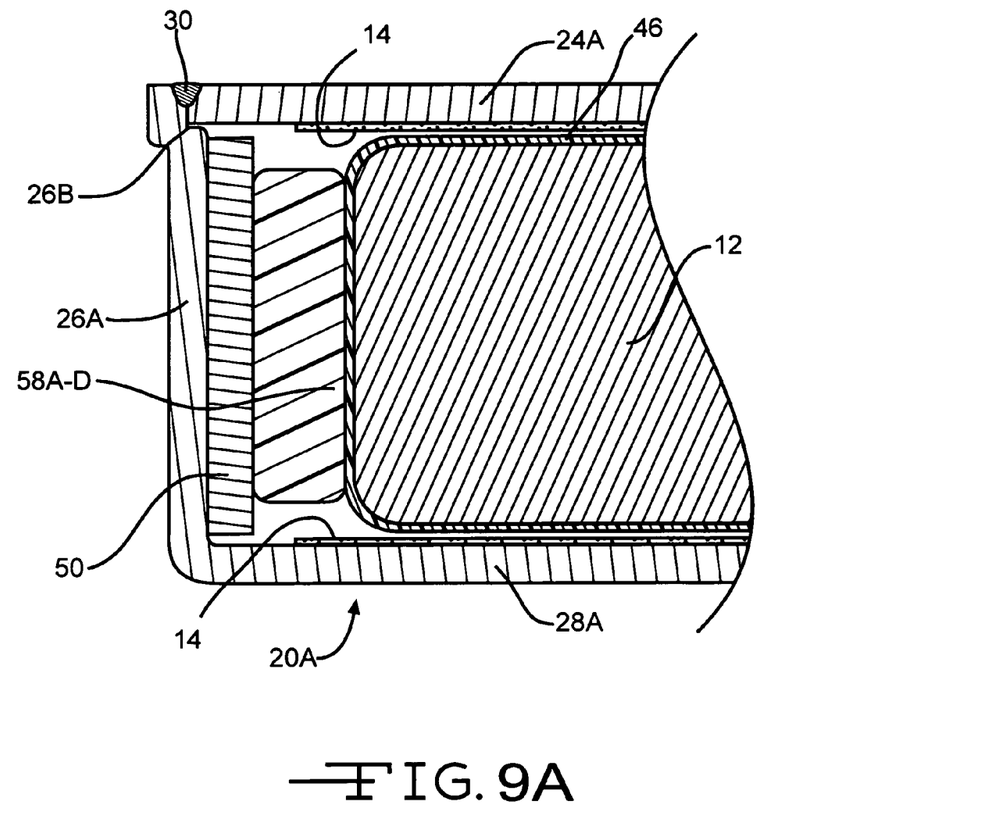
FIG. 9A is an embodiment similar to the view shown in FIG. 9, but with the capacitor housed in different casing.

FIG. 9A shows an alternate embodiment of a casing for the present capacitor. The casing comprises portion 20A having a surrounding sidewall 26A extending to a face wall 28A supporting cathode active material 14. The sidewall 26A has a step 26B at its upper end that received a plate 24A serving as a second face wall for supporting cathode active material 14. The plate 24A is nested in the step 26B. A weld 30 secures the plate 24A to the casing portion 20A at the step with the upper surface of the plate being coplanar with the upper end of the sidewall 26A. The remaining structure for this capacitor is as previously described.

Figure 10:
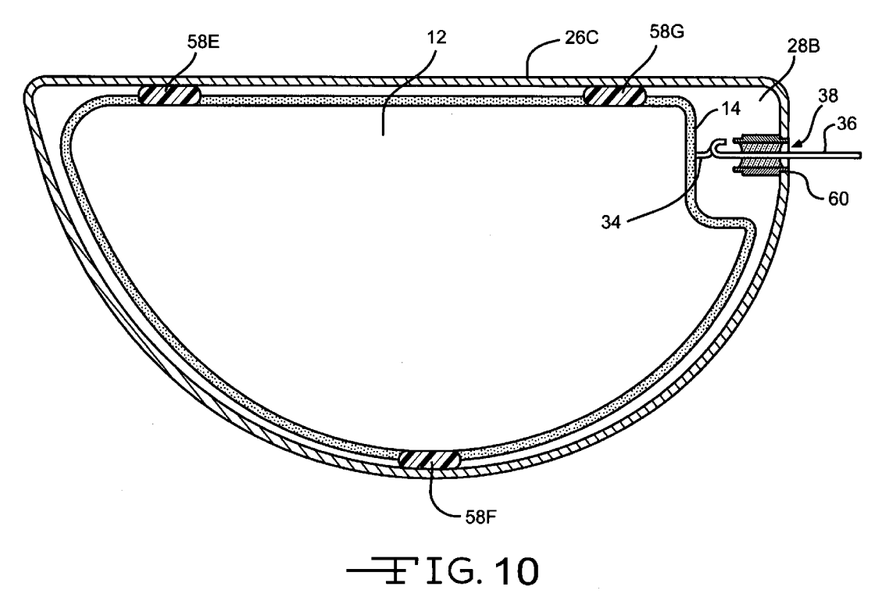
FIG. 10 is a side elevational view showing the anode 12 held in position in a casing portion by polymeric point restraints 58E to 58G, but without a weld strap.
Figure 10A:
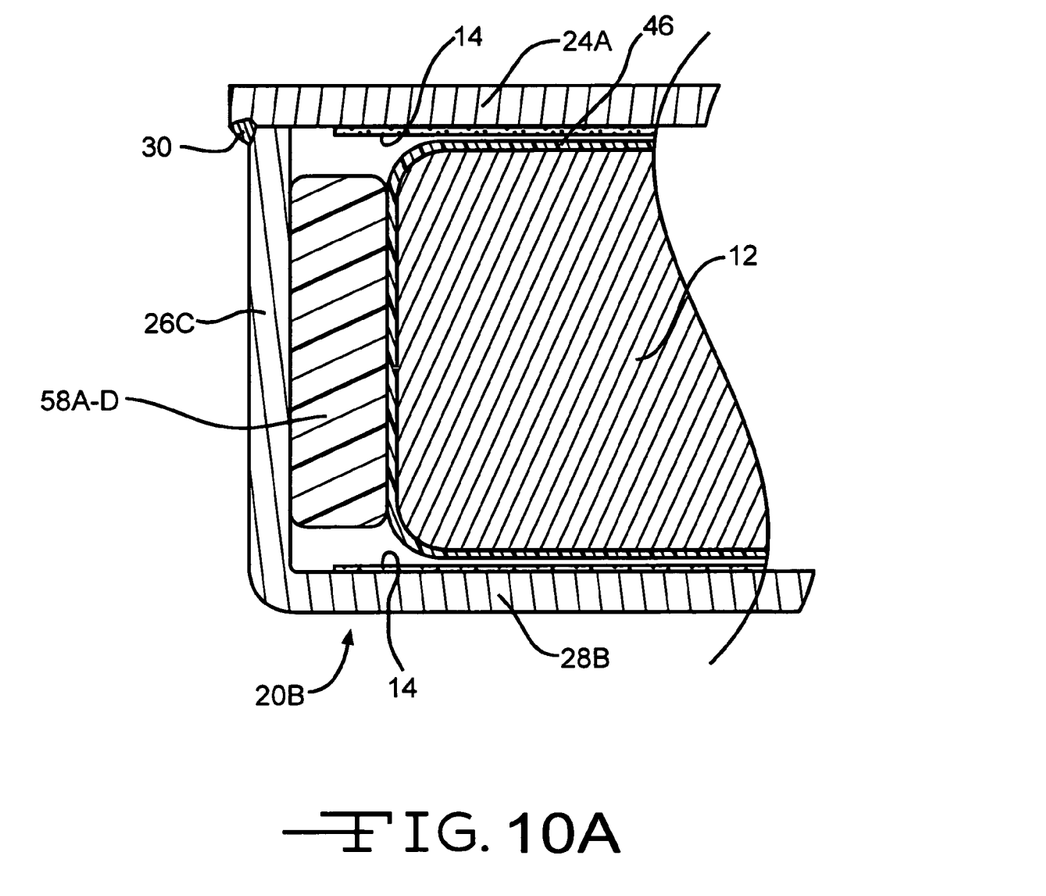
FIG. 10A is a cross-sectional view of FIG. 10.

FIGS. 10 and 10A show another embodiment of a casing for the present capacitor. The casing comprises portion 20B having a surrounding sidewall 26C extending to a face wall 28B supporting cathode active material 14. A plate 24A rests on the upper edge of the sidewall 26C and serves as a second face wall for supporting cathode active material 14. Plate 24A extends a short distance out beyond the sidewall 26C. A weld 30 then secures the plate 24A to the casing portion 20B where the plate overhangs or extends past the sidewall 26C. Also, in this embodiment, the weld strap has been eliminated. Elimination of the weld strap is possible with the laser beam being aimed at the corner where the plate 24A extends past the sidewall 26C. The remaining structure for this capacitor is as previously described.

Figure 11:
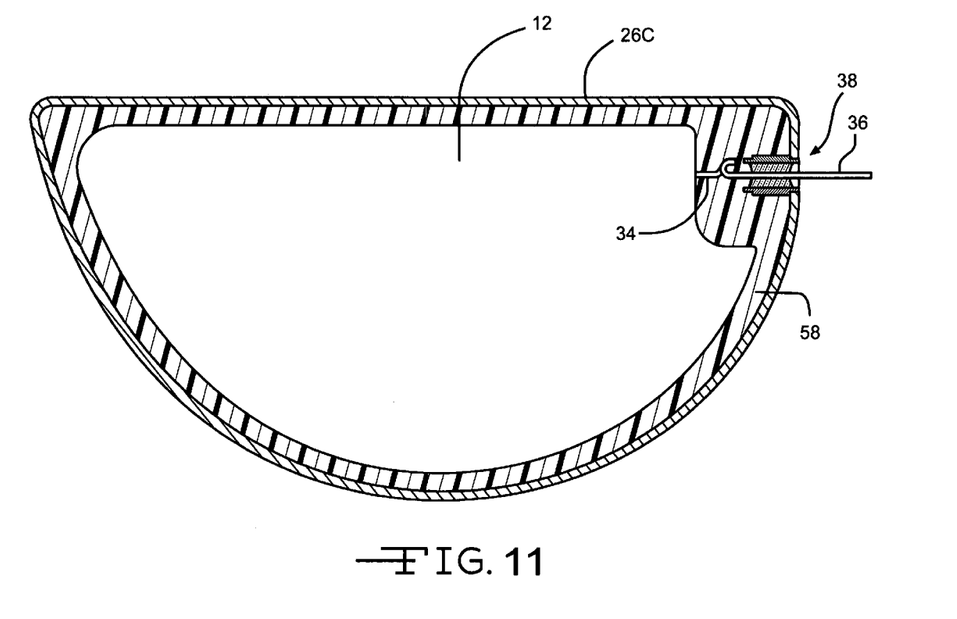
FIG. 11 is a side elevational view showing the anode 12 held in position in a casing portion by a continuous polymeric restraint 58, but without a weld strap.

FIG. 11 shows an alternate embodiment of a polymeric restraint for a capacitor anode 12. In this embodiment, the polymeric material 58 completely surrounds the anode sidewall. That is, the polymeric material restrains the anode by contacting the anode sidewall between its major face walls and the sidewall 26C of the casing portion 20B. Since there is no weld strap, the casing is similar to that shown in FIGS. 10 and 10A. If desired, a weld strap can be provided as previously described. In this embodiment, the electrolyte wets the anode 12 including the separator 46 and the cathode active material 14 at the opposed face walls.

Figure 12:
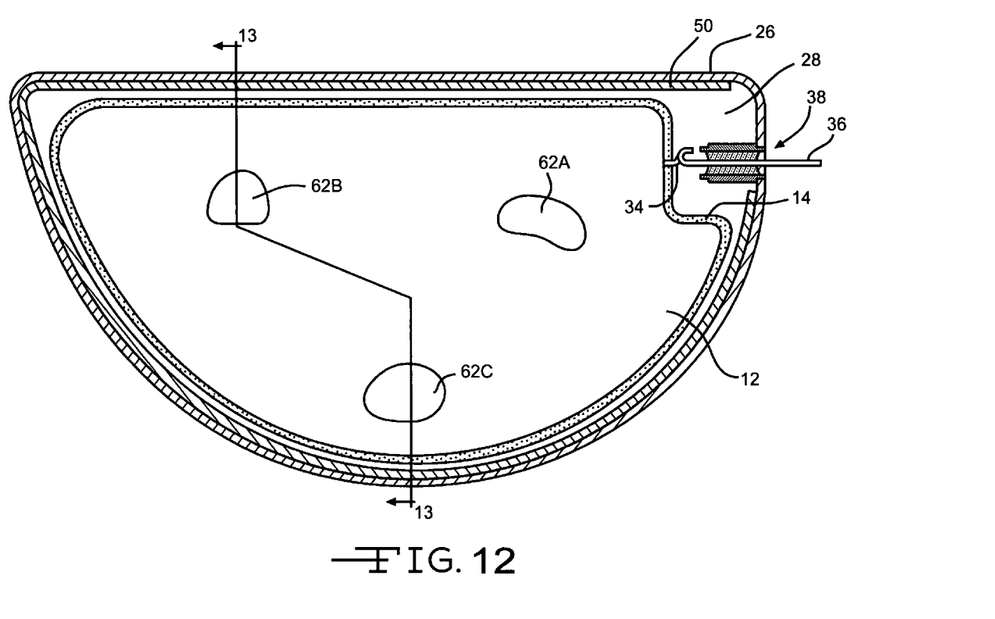
FIG. 12 is a side elevational view showing the anode 12 held in position in a casing portion by polymeric point restraints 62A to 62C at the anode face walls.
Figure 13:
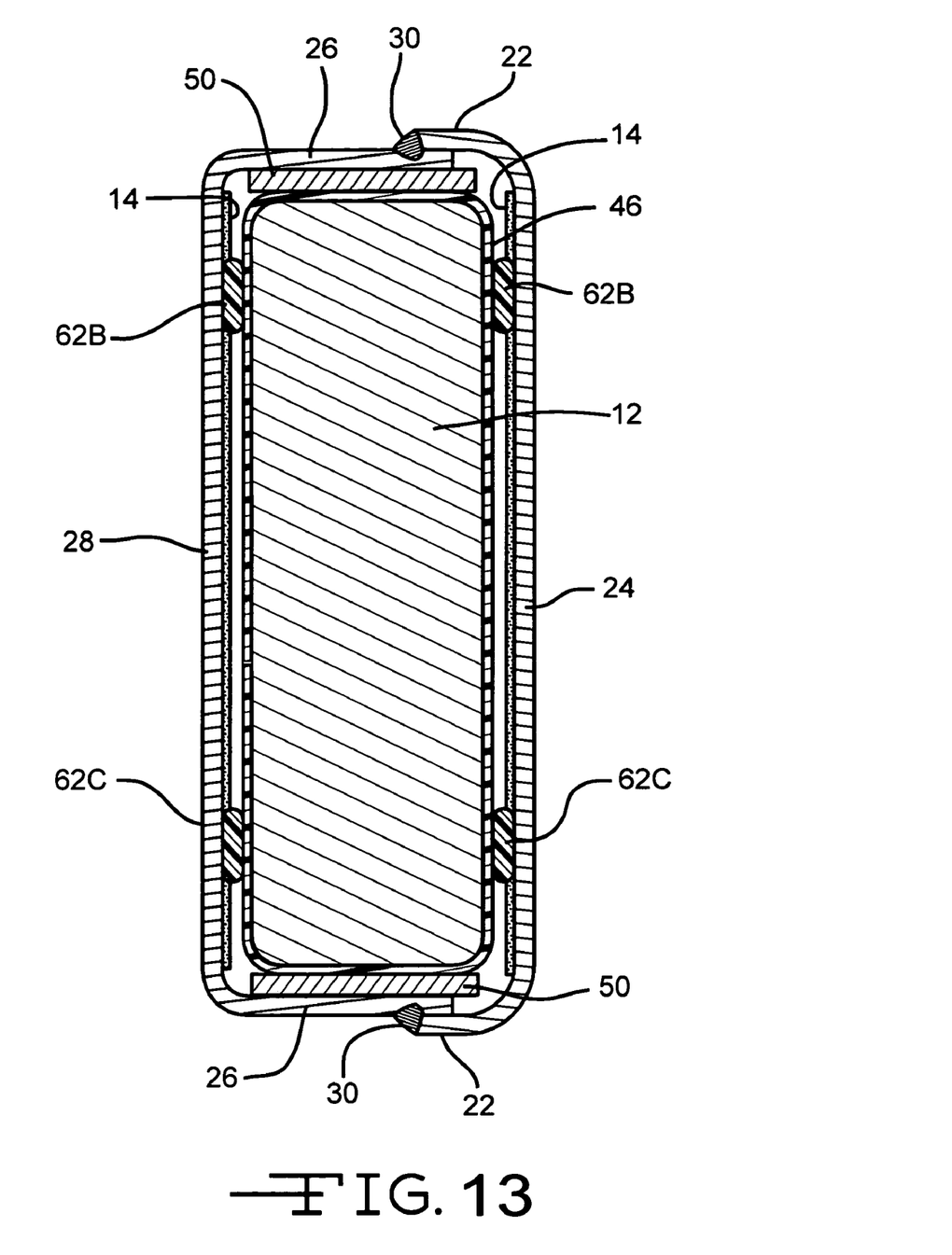
FIG. 13 is a cross-sectional view along line 13—13 of FIG. 12.

FIGS. 12 and 13 illustrate a further embodiment of the invention. The anode 12 is held or restrained in position by a plurality of polymeric point structures 62A, 62B and 62C contacting between the separator 46 at each anode face wall and the cathode active material 14 provided at the casing face walls. Three polymeric point restraints are the preferred minimum number, although more can be provided if desired. Also, the polymeric structures 62A to 62C can be used in conjunction with the previously described polymeric point restraints provided at the anode sidewall between the opposed anode face walls. Finally, this embodiment is shown with a weld strap 50, so the casing is similar to that shown in FIGS. 1, 7 to 9 and 9A. The polymeric structures 62A to 62C can also be provided in a casing similar to that shown in FIGS. 10 and 10A devoid of a weld strap.

Thus, various polymeric structures as point restraints have been shown and described. However, modifications may be readily apparent to those skilled in the art. For example, the polymeric point restraints 58A to 58D can be used in conjunction with the polymeric point restraints 62A to 62C to provide added protection against the anode 12 moving inside the capacitor 10 subjected to high shock and vibration forces.

Although the embodiments described herein show the polymeric restraints used with a single anode pellet that should not be construed as limiting. It is contemplate by the scope of the present invention that the polymeric restraints can be used with two or more side-by-side anodes provided in one of the previously described casings. Such a multiple anode design is shown in U.S. Pat. No. 6,850,405 to Mileham et al. This patent is assigned to the assignee of the present invention and incorporated herein by reference.

It is appreciated that various modifications to the inventive concepts described herein may be apparent to those of ordinary skill in the art without departing from the spirit and scope of the present invention as defined by the appended claims.

What is claimed is:

1. A capacitor, which comprises:
   a) a first casing portion comprising a first casing face wall supporting a first surrounding casing sidewall and a second casing portion comprising a second casing face wall, wherein the first casing portion is securable to the second casing portion to provide an enclosure for the capacitor;
   b) a cathode active material supported by, and in electrical contact with, the first and second casing face walls;
   c) an anode comprising an anode sidewall extending to first and second major anode face walls positioned adjacent to the cathode active material on the first and second casing face walls;
   d) a separator positioned intermediate the anode and the cathode active material on the first and second casing face walls;
   e) a glass-to-metal seal supported in at least one of the first and second casing portions to electrically insulate the anode lead from the enclosure serving as the cathode terminal;
   f) at least one restraint contacting the anode sidewall to prevent the anode from moving inside the enclosure when the capacitor is subjected to shock and vibration forces; and
   g) a working electrolyte provided in the enclosure in contact with the anode and cathode active material.

2. The capacitor of claim 1 wherein the restraint is of a polymeric material selected from the group consisting of a polyolefin, a fluoropolymer, a hot melt adhesive, a UV curable adhesive and a silastic material.

3. The capacitor of claim 1 wherein the restraint is continuous about the anode sidewall.

4. The capacitor of claim 1 wherein the restraint contacts the anode sidewall and a weld strap provided between where the first casing portion is secured to the second casing portion.

5. The capacitor of claim 1 wherein the restraint contacts the anode sidewall and the first casing sidewall.

6. The capacitor of claim 1 wherein there are a plurality of point restraints that each contact the anode sidewall and a weld strap provided between where the first casing portion is secured to the second casing portion.

7. The capacitor of claim 1 wherein the second casing portion is a plate supported at an upper edge of the first casing sidewall of the first casing portion.

8. The capacitor of claim 1 wherein the anode is selected from the group consisting of tantalum, aluminum, titanium, niobium, zirconium, hafnium, tungsten, molybdenum, vanadium, silicon, germanium, and mixtures thereof and the cathode active material is selected from the group consisting of ruthenium, cobalt, manganese, molybdenum, tungsten, tantalum, iron, niobium, iridium, titanium, zirconium, hafnium, rhodium, vanadium, osmium, palladium, platinum, nickel, lead, gold, silver, cobalt, and mixtures thereof.

9. The capacitor of claim 1 wherein the cathode active material is selected from an oxide, a nitride, and a carbon nitride of one of the group consisting of ruthenium, cobalt, manganese, molybdenum, tungsten, tantalum, iron, niobium, iridium, titanium, zirconium, hafnium, rhodium, vanadium, osmium, palladium, platinum, nickel, and lead.

10. A capacitor, which comprises:
    a) a first casing portion comprising a first casing face wall supporting a first surrounding casing sidewall and a second casing portion comprising a second casing face wall supporting a second surrounding casing sidewall, wherein at least a portion of the first casing sidewall is sized to fit inside the second casing sidewall to mate the first casing portion with the second casing portion as an enclosure for the capacitor;
    b) a cathode active material supported by, and in electrical contact with, the first and second casing face walls of the enclosure;
    c) an anode comprising an anode sidewall extending to first and second major anode face walls positioned adjacent to the cathode active material on the first and second casing face walls;
    d) a separator positioned intermediate the anode and the cathode active material on the first and second casing face walls;
    e) a glass-to-metal seal supported in at least one of the first and second casing portions to electrically insulate the anode lead from the enclosure serving as the cathode terminal;
    f) at least one point restraint contacting the anode sidewall to prevent the anode from moving inside the enclosure when the capacitor is subjected to shock and vibration forces; and
    g) a working electrolyte provided in the enclosure in contact with the anode and cathode active material.

11. The capacitor of claim 10 wherein the restraint is continuous about the anode sidewall.

12. The capacitor of claim 10 wherein the restraint contacts the anode sidewall and a weld strap provided between where the first casing portion is secured to the second casing portion.

13. The capacitor of claim 10 wherein the restraint contacts the anode sidewall and the first casing sidewall.

14. The capacitor of claim 10 wherein there are a plurality of point restraints that contact the anode sidewall and a weld strap provided between a seam created by the first surrounding sidewall of the first casing portion mated to the second surrounding sidewall of the second casing portion.

15. A method for providing a capacitor, comprising the steps of:
    a) providing a first casing portion comprising a first casing face wall supporting a first surrounding case sidewall, wherein a cathode active material is in electrical contact with the first casing face wall;
    b) providing an anode comprising an anode sidewall extending to first and second major casing face walls, wherein an anode wire extends from the anode;
    c) supporting an anode lead in a glass-to-metal seal and connecting the anode lead to the anode wire;
    d) enveloping the anode in a separator;
    e) providing a weld strap in a surrounding but spaced relationship with the anode sidewall;
    f) providing a plurality of point restraints contacting between the anode sidewall and the weld strap;
    g) nesting the anode including the restraints and the weld strap in the first casing portion with the first major anode face wall adjacent to the cathode active material and wherein the glass-to-metal seal is at least partially supported by the first casing sidewall with the anode lead extending there from;
    h) providing a second casing portion comprising a second casing face wall having the cathode active material in electrical contact there with and adjacent to the second major anode face wall;
    i) welding the first casing portion to the second casing portion to provide an enclosure for the capacitor; and
    j) providing an electrolyte in the enclosure in contact with the anode and cathode active material.

16. The method of claim 15 including providing the restraints of a polymeric material selected from the group consisting of a polyolefin, a fluoropolymer, a hot melt adhesive, a UV curable adhesive and a silastic material.

17. The method of claim 15 including positioning the anode enveloped by the separator in a fixture interior of the weld strap and then providing a plurality of spacers about the anode contacting the separator at the anode sidewall restraints.

18. The method of claim 17 including injecting a polymeric material into the fixture at spaced locations about the periphery of the anode to provide the restraints.

19. The method of claim 15 including nesting the anode having the plurality of restraints contacting an inner surface of the weld strap with the weld strap contacting at least one of the first and second casing portions.

* * * * *